Feb. 5, 1957     A. E. BREWSTER     2,780,670
TAPE RECORDING APPARATUS
Filed Oct. 7, 1953
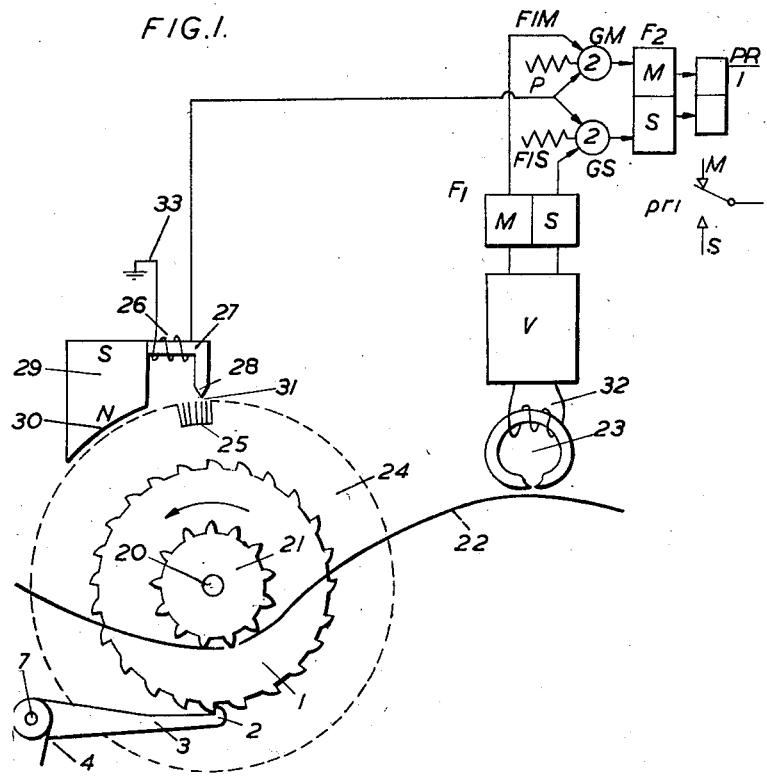
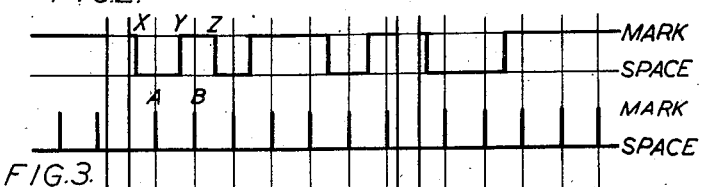
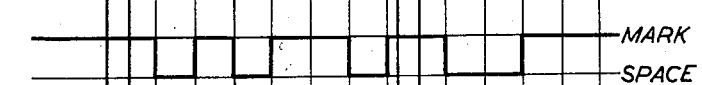
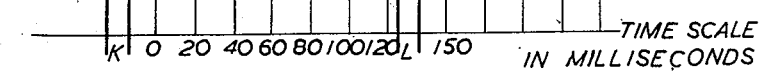
Inventor
A. E. BREWSTER United States Patent Office 2,780,670
Patented Feb. 5, 1957

2,780,670

TAPE RECORDING APPARATUS

Arthur Edward Brewster, London, England, assignor to International Standard Electric Corporation, New York, N. Y., a corporation of Delaware Application October 7, 1953, Serial No. 384,580

Claims priority, application Great Britain October 9, 1952

4 Claims. (Cl. 178—17)

This invention relates to tape recording apparatus and particularly to the regeneration of information stored by such apparatus.

In such systems the signal read from the tape by the read-head may be distorted. It is therefore desirable that the signal should be regenerated before re-transmission.

According to the present invention there is provided an apparatus for regenerating information stored in the form of telegraph type code signals on a tape, comprising a rotating shaft upon which is mounted a toothed wheel and a sprocket wheel for driving said tape, a pair of gate circuits, means for opening one gate circuit in response to a mark signal on said tape and the other gate circuit in response to a space signal on said tape, further means associated with said toothed wheel for producing one accurately timed pulse for each code element recorded on said tape, said accurate pulse being applied to both gate circuits whereby said accurate pulse passes through whichever gate circuit is open, means for operating a bi-stable device to one or the other of its stable positions depending upon whether said accurate pulse passes through said one gate circuit or said other gate circuit.

The invention will be described with reference to the accompanying drawings in which:

Fig. 1 shows schematically those parts of the recording apparatus which are concerned with regeneration; Figs. 2, 3 and 4 show waveforms occurring during the process of regeneration.

Referring to Fig. 1, a sprocket-wheel 21 mounted on the shaft 20 feeds the magnetic tape 22 to the read-head 23. The shaft 20 is driven by the main drive shaft of the apparatus through a slipping-clutch (not shown). If driven continuously the shaft 20 completes one revolution in 3.36 seconds, corresponding to twenty-four seven-unit characters, each of 140 milliseconds duration. Also mounted on the shaft 20 is a wheel 1 having twenty-four teeth. Thus the distance between any two teeth on the wheel 1 represents one character in seven-unit code, or 140 milliseconds.

The teeth of the wheel 1 may be engaged by the detent 2 mounted on the arm 3 of the bell-crank 4. When the detent 2 engages one of the teeth of the wheel 1 the slipping-clutch enables the detent to arrest the wheel 1, and thus also the shaft 20, in the manner described in my prior co-pending application Serial No. 384,529 filed October 7, 1953. When the arm 3 rotates about the pivot 7 clockwise as seen in the diagram the shaft 20 is free to rotate.

Also mounted on the shaft 20 is a clock pulse generating wheel 24 having 168 teeth of which only five are shown in the drawing, at 25. There is therefore a tooth on the wheel 24 corresponding to each of the seven elements of each of the twenty-four characters represented by one rotation of the shaft 20 and its associated wheels.

A coil 26 is wound on a core 27, the core having an extension which forms a tapered pole-piece at 28. A permanently magnetized pole-piece 29 is suitably shaped at 30 to offer a low reluctance path for the flow of magnetic flux to the wheel 24. Flux returns to the permanent magnet 29 via the pole-piece 28, finding high or low reluctance at 31 according as a tooth or a notch is presented to the pole-piece 28. As the wheel 24 rotates a pulsating potential is induced in the coil 26. Each pulse corresponds to the presentation of a tooth to the pole-piece 28. The pulses therefore occur at intervals of one unit, or 20 milliseconds during continuous rotation of the shaft 20.

The relative angular positions of the wheels 21 and 24 are such that a pulse is generated in the coil 26 approximately ten milliseconds after the commencement of any code-element as received by the read-head 23.

The pulses induced in the coil 26 are extended over the lead P to an input of each of the gates GM and GS. The gate circuits are represented functionally by circles. The input controls and output of the gates are indicated by arrows. Each gate circuit has two controls or inputs and one output, the former being represented in the figure by two arrows pointing towards the circle and the latter by an arrow pointing away from the circle. The encircled numeral 2 indicates in each case that coincidence is required between the arrival of a pulse at each of the two control inputs to render that gate conducting. The circuit for pulses induced in the coil 26 is completed via the earthed connections of the biasing sources of the gates GM and GS (not shown in detail) and the earthed lead 33 of the coil 26.

The signal generated in the coil 32 of the read-head 23 is amplified by the amplifier V and reaches the read-head flip-flop F1 in the distorted form shown in Fig. 2.

A space element received by the flip-flop F1 and commencing at the point X (Fig. 2) causes F1 to conduct on its S-side and is thus extended over the lead F1S (Fig. 1) to the gate circuit GS. The space condition persists, and approximately 10 milliseconds later, at zero on the time-scale the pulse A (Fig. 3) is generated in the coil 26 and is extended by the lead P to the inputs of the gates GM and GS. Since a priming potential already exists over the lead F1S, the gate GS conducts and the final flip-flop F2 conducts on its S-side thus initiating the sending of a space condition by the line relay PR. This space condition of the relay persists as long as F2S is conducting.

Upon the transition from space to mark at Y (Fig. 2) the flip-flop F1 goes over to its M-side conducting thus priming the gate GM over the lead F1M. Meanwhile the gate GS ceases to conduct but the relay PR continues to send the space condition.

Twenty milliseconds after the generation of the pulse A in the coil 26 the pulse B is generated and is extended over the lead P to the gates GM and GS. The gate GM now conducts and the flip-flop F2 conducts on its M side. The line relay PR then sends the mark signal to line. The relay continues to send the signal until the generation of the third clock-pulse C (Fig. 3) causes the transition Z (Fig. 2) to be reproduced by the line relay.

In this way the distorted signal of Fig. 2 is regenerated as the accurately timed signal of Fig. 4. The millisecond rest-periods K and L are introduced in the restoration process described in the above-mentioned application Serial No. 384,579.

What I claim is:

1. An apparatus for regenerating information stored on a record medium in the form of telegraph signal combinations made up of code elements having different characteristics, means for sensing said record medium for said stored information, means for advancing said record medium past said sensing means in sensing relation therewith, means for locally generating a train of electrical clock pulses, said generating means adapted to be controlled by said advancing means, each generated pulse having a duration equal to that of a code element, arresting means coupled to said advancing means, said arresting means adapted to periodically arrest said advancing means, the period of said arresting means being equal to a signal combination, a pair of two input gate circuits, a first one of the inputs of both said circuits coupled to said generating means, and the second input of each of said gate circuits coupled to said sensing means in such a manner that one of said gate circuits opens when a code element having a first characteristic is sensed and the other of said gate circuits opens when a code element having a second characteristic is sensed, a bi-stable switching device coupled to said gate circuits in a manner whereby opening of said first gate circuit causes said device to assume a first stable position and the opening of said other gate circuit causes said device to assume another stable position, and code re-transmitting means under control of said device, whereby said retransmitting means operates upon the coincidence of a clock pulse and a stored code element at either of said gate circuits.

2. An apparatus as claimed in claim 1 and wherein said generating means comprises a permanent magnet having one pole adjacent a portion of the periphery of a rotating toothed wheel and its other pole connected to a soft iron pole piece carrying a coil, the end of said pole piece remote from said permanent magnet being tapered and adjacent a further portion of the periphery of said toothed wheel, said toothed wheel, the gap between said toothed wheel and said pole, and the gap between said toothed wheel and said pole piece completing the magnetic circuit for said permanent magnet, the areas of said pole and said pole piece facing said teeth being so chosen that the reluctance of said magnetic circuit changes to induce a pulse in said coil as said pole piece passes between the teeth on said rotating toothed wheel.

3. An apparatus as claimed in claim 1 and wherein said recording medium is a magnetic tape and said code signals are recorded longitudinally upon it.

4. An apparatus as claimed in claim 1 and wherein said device is a bi-stable flip-flop circuit and said re-transmitting device is a relay, said flip-flop adapted to operate said relay to one or other of its two transmitting positions.

References Cited in the file of this patent

UNITED STATES PATENTS

| | | |
|---|---|---|
| 2,597,866 | Gridley | May 27, 1952 |
| 2,609,143 | Stibitz | Sept. 2, 1952 |
| 2,675,427 | Newby | Apr. 13, 1954 |